Aug. 12, 1930.  A. T. GRAY  1,772,992
PISTON RING RETAINER
Filed May 29, 1929
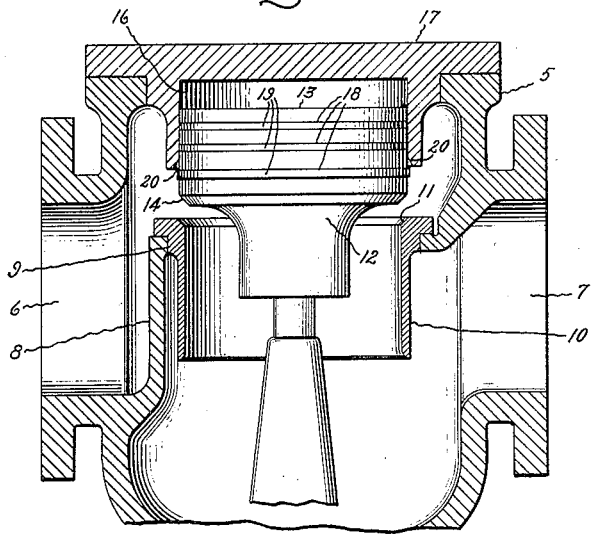
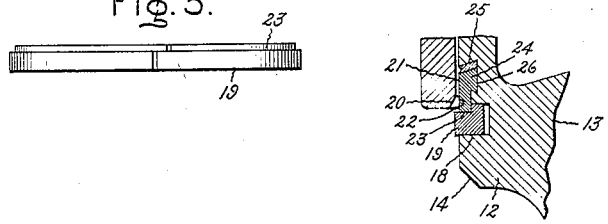
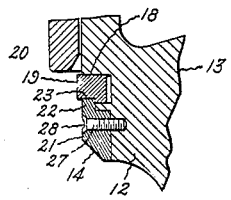
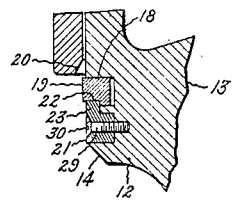
Inventor:
Alexander T. Gray,
by Charles E. Tullar
His Attorney.

Patented Aug. 12, 1930

1,772,992

UNITED STATES PATENT OFFICE

ALEXANDER T. GRAY, OF SCHENECTADY, NEW YORK, ASSIGNOR TO GENERAL ELECTRIC COMPANY, A CORPORATION OF NEW YORK

PISTON-RING RETAINER

Application filed May 29, 1929. Serial No. 366,982.

The present invention relates to machines in which a piston is provided that has a reciprocating movement within a cylinder, and is particularly directed to valves in which the stroke of the valve actuating piston is of such length as to move one or more of the metallic packing rings out of engagement with the wall of the cylinder on the outward stroke and into engagement therewith on the inward stroke. These rings which are located in grooves in the piston are split and are so constructed as to spring or expand outwardly and into engagement with the cylinder wall to prevent leakage of fluid under pressure from one side of the piston to the other. The rings are also free to move to a limited extent within the groove in a direction perpendicular to the axis of the piston as there is a small clearance between the inner wall of the ring and the bottom of the groove. In other words the ring instead of remaining in its concentric position with respect to the piston may, when beyond the cylinder wall, assume an eccentric position in which it projects more on one side of the piston than on the other. As a result of the above specified construction it has come to my attention in connection with a certain well known type of valve that the lower or outer ring sometimes jams against the bottom edge of the cylinder on the inward stroke with the result of seriously injuring the valve parts. It may in some cases result in serious trouble with the apparatus controlled by the valve such as a turbine due to over-speeding thereof.

My invention has for its object to improve the construction and arrangement of piston packing rings to the end that their expansion or radial enlargement when moved beyond the confines of the cylinder wall is limited to a small and safe amount, and further that in their expanded condition are held in concentric relation to the piston itself.

In the accompanying drawings Fig. 1 is a longitudinal sectional view with parts in elevation of a valve structure embodying my invention; Figs. 2, 3 and 4 are enlarged sectional views of portions of the piston and cylinder structure showing several embodiments of my invention, and Fig. 5 is an edge view of an expansible packing ring.

Referring to Fig. 1 of the drawings, 5 indicates a valve casing or body having an inlet 6 and an outlet 7. In the casing is a wall 8 having an opening 9 in which is located a cylinder 10 provided with a beveled edge forming a valve seat 11. The actuating piston 12 has a beveled face 14 forming a valve which is adapted to engage seat 11 when closed. The piston is arranged to reciprocate in cylinder 16 which is formed integral with a removable head 17 of the valve casing. The piston has a plurality of annular grooves cut therein in which are disposed split expansible packing rings 19 which resist leakage between the balancing chamber above the piston and the steam space below it. The means for controlling the action of the piston are not shown since any of the well known arrangements may be employed for the purpose. The lower end of cylinder 16 has a beveled or chamfered surface 20 for compressing the rings 19 to the size of the bore of the cylinder when the rings move into engagement with the cylinder wall.

If the rings 19 expand too much or are disposed in their grooves 18 from a concentric to an accentric position when out of engagement with cylinder 16 and the valve is moved toward its open position the rings jam between the beveled surface 20 and the walls of the ring containing grooves causing breakage of the rings or piston, or both, and may score the walls of cylinder 16. Broken parts of rings or pistons may be carried by the steam into the turbine blades or other parts and cause very serious damage. The jammed parts may cause an overspeeded or a disabled turbine unit.

According to my invention I provide means for limiting the expansion and transverse or radial displacement of the rings 19 relative to the grooves 18 so that the rings are positively prevented from moving out of their proper places. As shown in Fig. 2, I provide a retaining ring 21 having a flange 22 which cooperates with a groove 23 cut in the side of the ring 19 to restrain the same from abnormal movements within the groove 18. The base 24 of the retaining ring 21 is in the form of a dovetail and is secured to the piston by a calking material 25 in an undercut annular groove 26. The calking material 25 may be copper or any suitable material.

The retaining ring may be placed either above or below the packing ring as shown by Figures 2 and 4 and in new assemblies may be made solid as in the embodiment shown in Fig. 3. In the embodiments shown in Figs. 2 and 4 the retaining rings are of the split or divided type.

Figs. 3 and 4 show a modified means of fastening the retaining rings 21 by means of the valve 13 itself. In Fig. 3 studs 27 are employed which are threaded into the piston and the heads 28 thereof riveted over. In this instance the beveled face 14 of the valve is formed on the retaining ring 21 instead of on the piston 12.

In Fig. 4 a stud 29 having a beveled head 30 is screw threaded into the piston above the valves and the margin of the screw head pressed into the retaining ring 21 by prick punching to insure its retention in assembled relation.

All of the piston rings may be made in accordance with my invention or only those rings which on the outward stroke of the piston move bodily out of the cylinder.

In accordance with the provisions of the patent statutes, I have described the principle of operation of my invention, together with the apparatus which I now consider to be the best means of carrying my invention into effect, but I desire to have it understood that the apparatus shown is only illustrative and that the invention can be effected by other means.

What I claim as new and desire to secure by Letters Patent of the United States is:

1. The combination of a piston havng a circumferential groove, an expansible packing ring which is free to move in said groove, an undercut groove in the piston adjacent the first named groove, a retaining ring, calking material for securing the retaining ring in the undercut groove, and cooperable means on said ring for preventing displacement of the packing ring from said first mentioned groove.

2. The combination of a piston having a circumferential groove, an expansible packing ring which is free to move in said groove, an undercut groove in the piston adjacent to the first-named groove, a retaining ring, means securing the retaining ring in the undercut groove, and cooperable means on said rings for preventing displacement of the packing ring from the said first-mentioned groove and for holding the same in concentric relation to the piston.

In witness whereof, I have hereunto set my hand this 28th day of May, 1929.

ALEXANDER T. GRAY.